United States Patent [19]

Boumarafi et al.

[11] Patent Number: 5,050,907
[45] Date of Patent: Sep. 24, 1991

[54] ADJUSTABLE SEAT BELT ANCHORAGE

[75] Inventors: Mohamed Boumarafi, Rochester Hills; Carl Pondell, Sterling Hgts., both of Mich.

[73] Assignee: Allied-Signal Inc., Morris Township, Morris County, N.J.

[21] Appl. No.: 664,418

[22] Filed: Mar. 1, 1991

Related U.S. Application Data

[63] Continuation of Ser. No. 546,132, Jun. 29, 1990, abandoned.

[51] Int. Cl.$^5$ .............................................. B60R 22/20
[52] U.S. Cl. ................................. 280/808; 297/486; 297/483
[58] Field of Search ............... 280/801, 808; 297/483, 297/486

[56] References Cited

U.S. PATENT DOCUMENTS

| Re. 32,524 | 10/1987 | Temple | 280/808 |
|---|---|---|---|
| Re. 33,398 | 10/1990 | Grunewald | 280/808 |
| 4,135,737 | 1/1979 | Scholz | 280/808 |
| 4,173,357 | 11/1979 | Jahn et al. | 280/808 |
| 4,239,260 | 12/1980 | Hollowell | 280/806 |
| 4,522,426 | 6/1985 | Weman | 280/808 |
| 4,556,255 | 12/1985 | Kawai | 297/483 |
| 4,573,708 | 3/1986 | Brorsson | 280/808 |
| 4,610,464 | 9/1986 | Yasumatsu et al. | 280/808 |
| 4,652,012 | 3/1987 | Biller et al. | 280/808 |
| 4,786,081 | 11/1988 | Schmidt | 280/808 |

FOREIGN PATENT DOCUMENTS

| 3305955A | 2/1983 | Fed. Rep. of Germany . |
|---|---|---|
| 2124889A | 10/1982 | United Kingdom . |
| 2132071A | 11/1983 | United Kingdom . |
| 2136270A | 1/1984 | United Kingdom . |
| 2138670A | 4/1984 | United Kingdom . |

Primary Examiner—Kenneth R. Rice

[57] ABSTRACT

An adjustable seat belt anchorage (20) comprising: a guide rail (22) adapted to be secured to a portion of a vehicle (24) generally at or above occupant shoulder height, the guide rail (22) forming an open channel (34), and a plurality of pairs of cut-outs (36) oppositely positioned in front walls (28) thereof; a latch plate assembly (50) comprising: a resilient carrier (52) slidingly received within the channel (34); a latching mechanism (54) biased into the guide rail by the carrier (52) and supported by and movable within the carrier (52) including a latch bar (112) extending upwardly from the carrier (52) for engaging a selected pair of cut-outs (36) and a bushing (102) for supporting a D-ring (140), wherein the point of attachment of the D-ring is located relative to the latch bar (112) in a manner that forces and torques exerted upon the safety belt (146) and D-ring (140) tend to urge the latch bar (112) into the cut-outs (36) in the guide rail (22) and a spring (56) comprising a coiled end (84) slidably received within a portion of the carrier (52) and extendable along the guide rail (22) as the carrier is moved therealong including an attachment end (122) secured to the guide rail proximate a first stop (32).

12 Claims, 4 Drawing Sheets

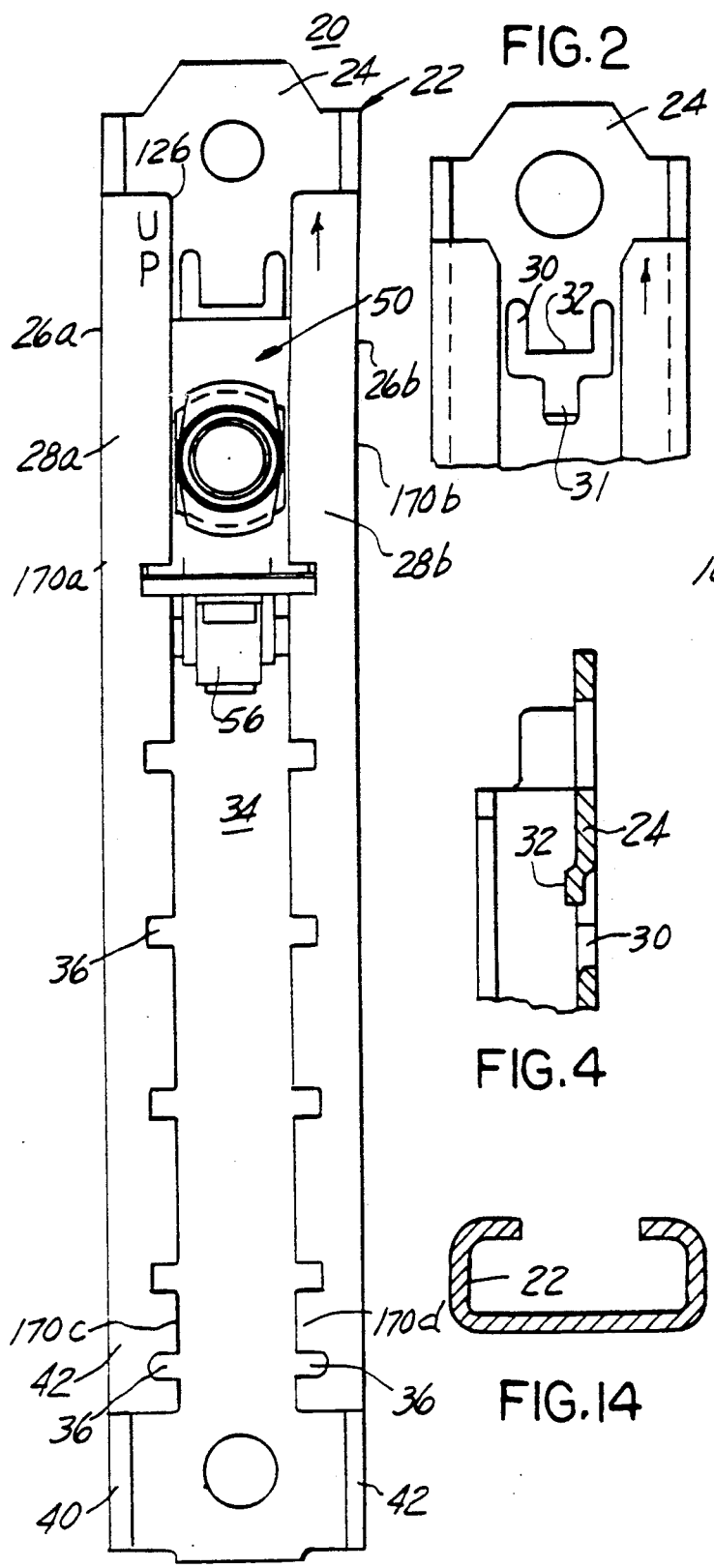
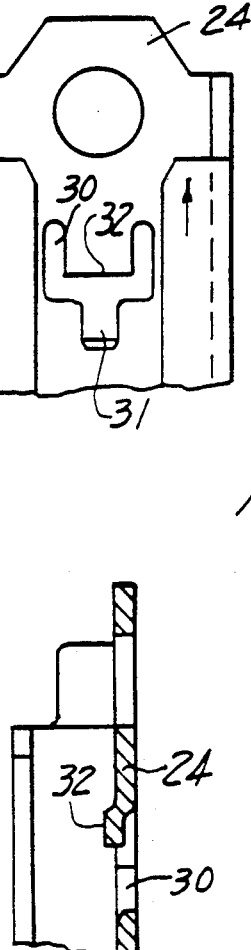
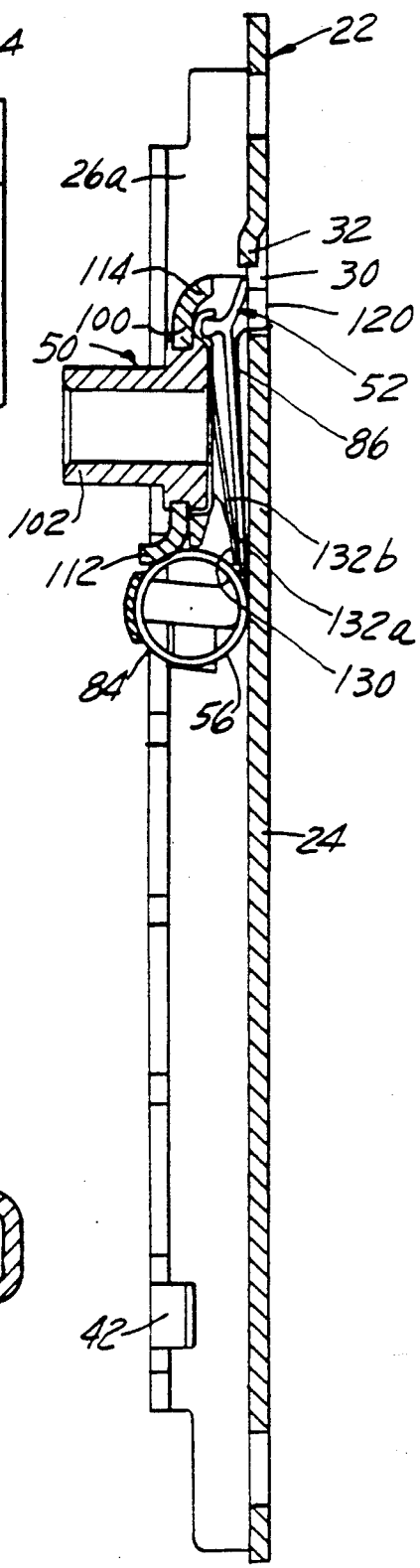
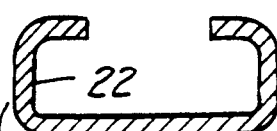
FIG. 1
FIG. 2
FIG. 3
FIG. 4
FIG. 14

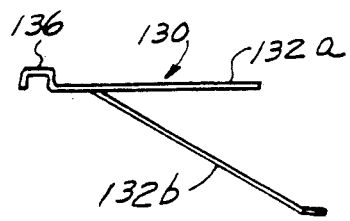
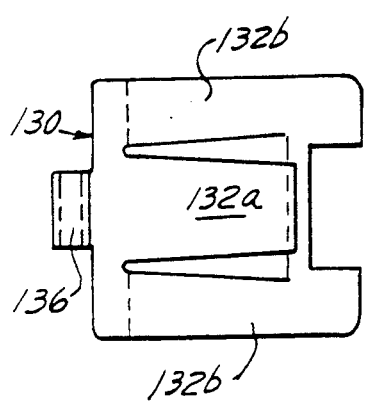
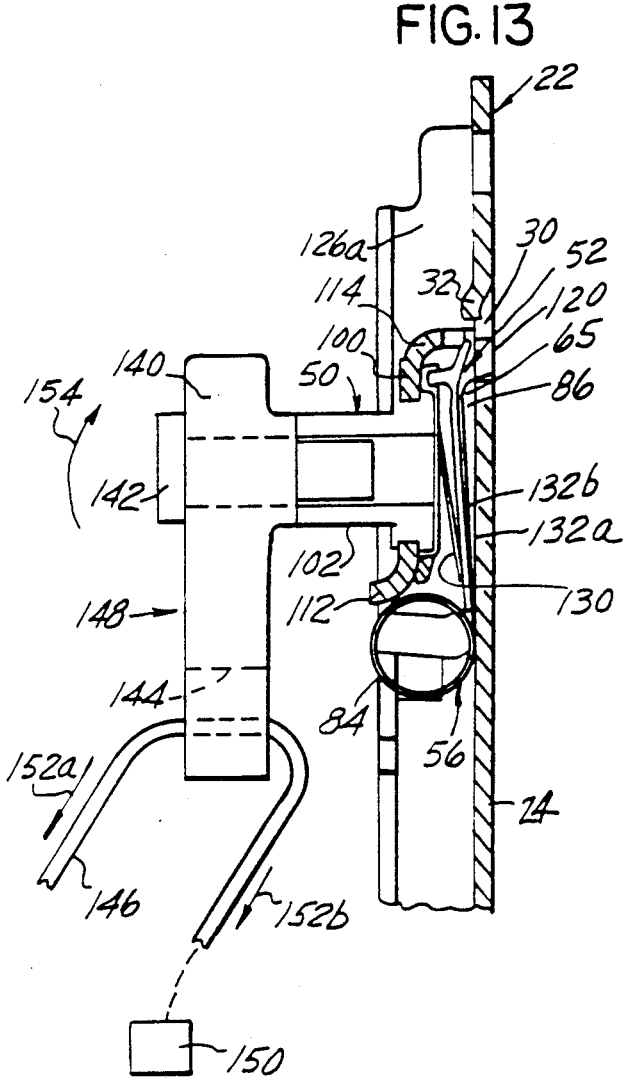
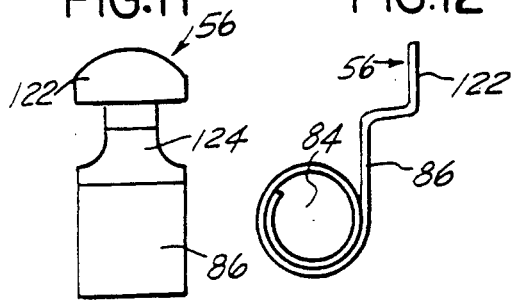

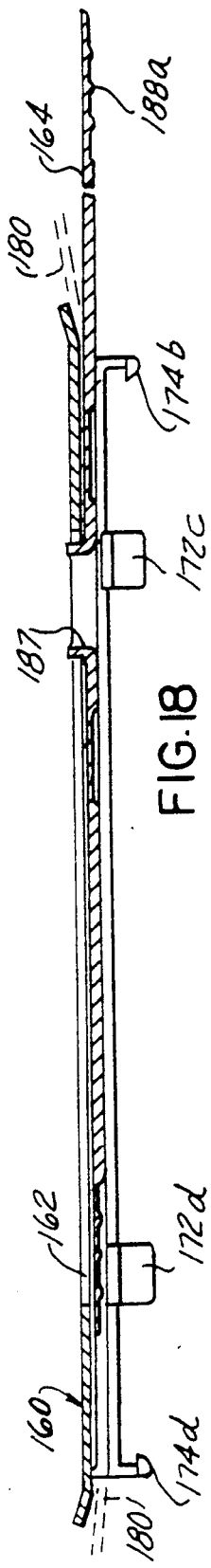
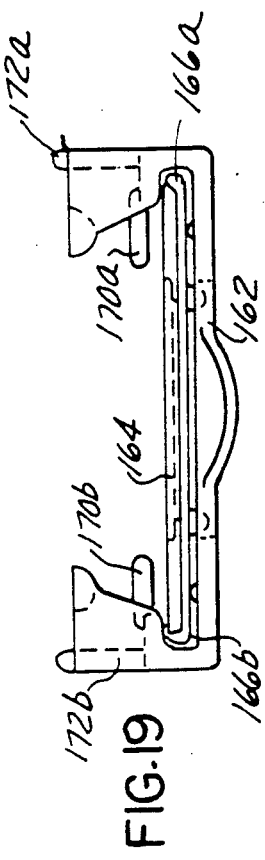
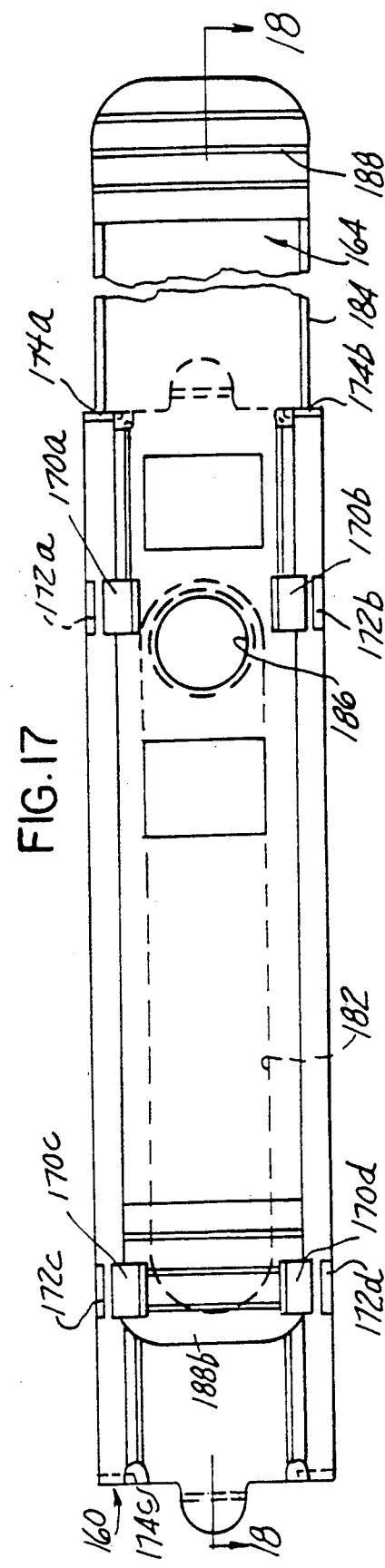

ADJUSTABLE SEAT BELT ANCHORAGE

This application is a continuation of application Ser. No. 07/546,132 filed June 29, 1990, now abandoned.

BACKGROUND AND SUMMARY OF THE INVENTION

The present invention relates to an adjustable anchorage for seat belts for the protection of vehicle occupants. The present invention finds application in what is known as a three-point seat belt system in which the seat belt and in particular the shoulder belt portion is looped through a D-ring or similar device which is often fixedly attached to the "B" pillar of a vehicle. The rigid attachment of the D-ring or anchorage to the vehicle does not provide flexibility in the operation of the seat belt system to accommodate varying sizes of the occupants. In a system employing a fixed anchorage, the anchor point is chosen to accommodate an occupant of average size. In this manner the shoulder belt is designed to contact the shoulder of the occupant and then extend diagonally across the occupant's torso to a buckle. This, however, is not the case with occupants who are taller or shorter than average. To accommodate for varying size of occupants, adjustable anchorage mechanisms have been proposed in the prior art, one of which is the commonly owned U.S. Pat. No. 32,524. Other adjustable anchorage mechanisms can be found in U.S. Pat. No. 4,556,255 as well as in a variety of Great British patent applications such as 2,124,889; 2,132,071; 2,136,070 and 2,138,670.

It is an object of the present invention to provide a manually adjustable seat belt anchorage which is of simple construction and one which maintains its structural integrity and performance during high deceleration and vehicle crash situations.

Accordingly, the invention comprises: an adjustable seat belt anchorage comprising: a guide rail adapted to be secured to a portion of a vehicle generally at or above occupant shoulder height. The guide rail forms an an open channel, and includes a plurality of pairs of cut-outs oppositely positioned in a front walls of the guide rail. The anchorage further includes a latch plate assembly comprising: a resilient carrier slidingly received within the channel; a latching mechanism is biased into the guide rail by the carrier and supported by and movable within the carrier. The latching mechanism includes a latch bar extending upwardly from the carrier for engaging a selected pair of cut-outs and an attachment means such as a threaded bushing for supporting a safety belt support device such as a D-ring. The support or D-ring is adapted to receive a portion of the safety belt, wherein the point of attachment of the D-ring is located relative to the latch bar means in a manner that forces and torques exerted upon the safety belt and D-ring tend to urge the latch bars into the cut-outs in the guide rail. A spring is provided to bias the latching means upwardly. The spring includes a coiled portion slidably received within a portion of the carrier and extendable along the guide rail as the carrier is moved therealong including an attachment end secured to the guide rail proximate a mechanical first stop.

Many other objects and purposes of the invention will be clear from the following detailed description of the drawings.

BRIEF DESCRIPTION OF THE DRAWINGS

In the drawings:

FIG. 1 illustrates a front plan view of a guide rail and a latch plate assembly.

FIG. 2 is a partial view of FIG. 1 without the latch plate assembly.

FIG. 3 illustrates a cross-sectional view taken through section 3—3 of FIG. 1.

FIG. 4 is a partial view of FIG. 3 without the latch plate assembly.

FIGS. 11 and 12 illustrate front and side views of a spring.

FIG. 13 illustrates an D-ring attached to the latch plate assembly.

FIG. 14 illustrates a cross-sectional view taken through section 14—14 of FIG. 2.

FIGS. 15 and 16 illustrate various views of a spring.

FIGS. 17, 18 and 19 illustrate a bottom plan, cross-sectional and end view of a cover for the guide rail and latch plate assembly.

DETAILED DESCRIPTION OF THE DRAWINGS

Figure 5:
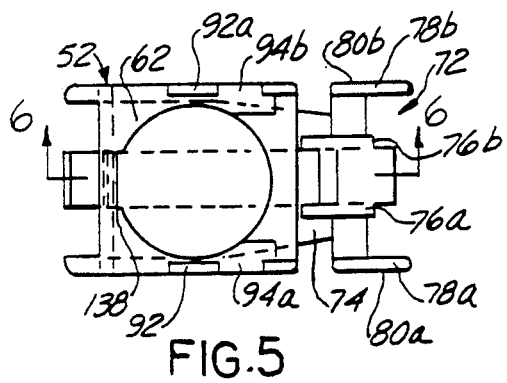
FIGS. 5-8 illustrate various views of a carrier.

FIGS. 1 through 4 illustrate many of the major components of an adjustable seat belt anchorage 20 in accordance with the present invention. More specifically, these figures illustrate a guide rail 22 adapted to be secured to the "B" post of a vehicle at or above shoulder height of the occupant. The guide rail includes a rear wall 24, side walls 26a and b and spaced front walls 28a and b forming a channel or groove 34. Formed in the top portion of the guide rail 22 is a Y-shaped slot 30, having a lower cut-out 31. A center tab 32 formed in the rear wall 24 extends into the channel or open groove 34 to provide a mechanical stop. The front walls 28a and b include a plurality of oppositely positioned pairs of cut-outs 36. The lower end 40 of the top walls 28 are bent over such as at 42 to provide another mechanical stop. Slidably positioned within the guide rail 22 is a latch plate assembly 50, also shown in FIGS. 1 and 3. The latch plate assembly 50 comprises a carrier 52 (also shown in FIGS. 5 through 8), a latching mechanism 54 (also shown in FIGS. 9 and 10), and a return spring 56. As is evident from the drawings, the carrier 52 supports the latching mechanism 54.

Figure 6:
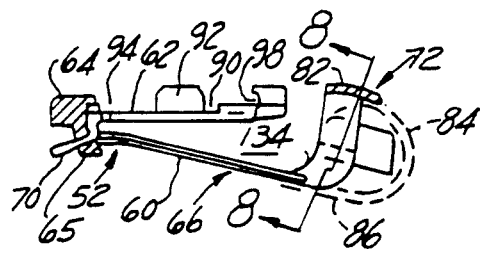
Figure 7:
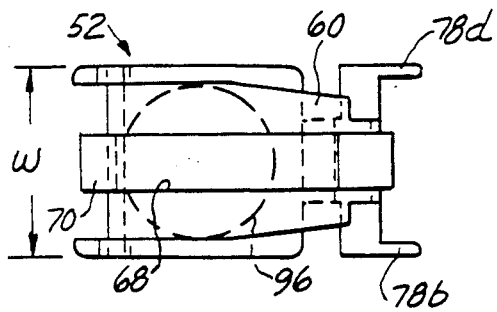
Figure 8:
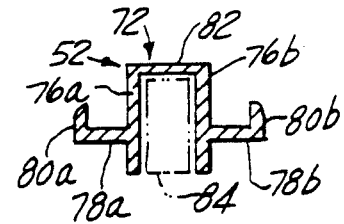

In the preferred embodiment of the invention, the carrier 52 is fabricated of a resilient material having a low coefficient of friction such as an acetal copolymer. The carrier 52 comprises a lower carrier plate 60 and an upper carrier plate 62 extending from a reinforced end 64, the lower portion 65 of which slides on the rear wall 24. The width of the carrier plate w is slightly smaller than the width of the channel or open groove 34 to permit entry. The lower carrier plate 60 is flexible, and in its bottom region generally shown as 66 (see FIG. 7), has a centrally disposed groove 68 under which is received a portion of the spring 56. A portion 70 of the lower carrier plate 60 essentially positioned in the cut-out region 66, proximate the end 64, extends axially out from the carrier 52. As will be seen from the description below, and as can be seen from FIG. 3, this extension 70 engages the tab or stop 32 preventing the latch plate assembly 50 from sliding out from the top of the groove 34 of the guide rail 22. Extending upwardly from the lower carrier plate 60 is a spring retainer and carrier guide mechanism, generally shown as 72. This mechanism extends from the narrowed end 74 of the lower carrier plate and comprises a pair of spaced vertically extending posts 76a and b. Extending laterally from each post are radial flanges or ribs 78a and b, defining engagement surfaces 80a and b, which coact with the interior of the side walls 26a and b to prevent skewing of the carrier 52 as it slides within the channel 34. A top portion joins the posts generally shown as 82, and is arcuately shaped. A coiled portion 84 (shown in phantom line) of the spring 56 is received between the posts 76 and top 82. As shown in FIG. 6, a flat portion 86 of the spring extends underneath the lower carrier plate in the groove 68. The spring portions 84 and 86 are shown in phantom line in those FIGUREs. As can be appreciated, the spring biased the carrier 52 upwardly.

With reference to FIGS. 5 and 6, it can be seen that the top carrier plate 62 comprises a recess 90 formed by partial walls 92 including cut-out portions 94 to receive the latching mechanism 54. The top carrier plate 62 further includes a central opening 96, the purpose of which will be described below. Part of each wall 92 includes a recess or cut-out such as 98 for receipt of another portion of the latching mechanism 54.

Figure 9:
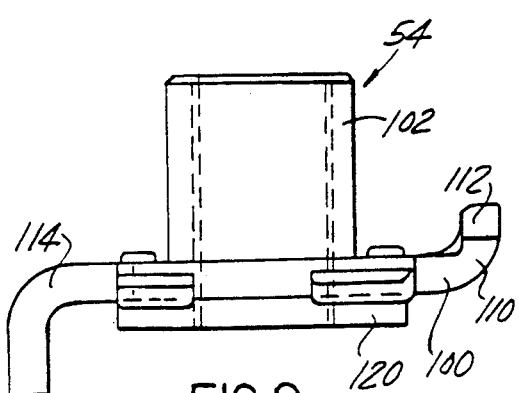
FIGS. 9 and 10 illustrate side and top views of a latch mechanism.
Figure 10:
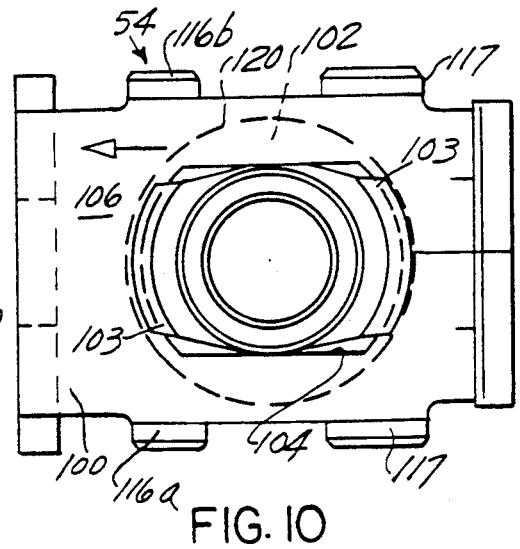

With reference to FIGS. 9 and 10, there is shown the latching mechanism 54 which comprises a latch plate 100 and bushing 102. The latch plate includes an opening 104 in a generally central flat portion 106 thereof. The bushing is inserted through the opening 104. A portion 103 of the bushing is swaged against the flat portion 106 of the latch plate 100. At one end 110 the latch plate curves upwardly forming a latch or bar 112. At the opposite end the latch plate 100 curves downwardly at 114 and includes a cut-out 116 through which is received the extending portion 70 of the carrier 52. Formed within the flat portion 106 are extending flanges 116a and b. Flanges 116a fit within the openings 94 formed within the carrier, while flanges 116b fit within similar openings 94b. Ends 117 of these flanges are also received within the cut-outs 98 formed in the carrier 52. During assembly, the latch plate 100 is fitted to the recess 90 of the upper plate 62 of the carrier such that flanges 116a fit within the spaces 94, flanges 116b fit and snap within the recess or cut-out 98 and the downwardly curved portion is secured over the end 64. In this position, the flanged portion 120 of the bushing extends into the opening 96 of the carrier.

FIGS. 11 and 12 illustrate various views of the spring 56 in its coiled configuration. The spring 56 is a coiled spring having a coiled portion 84 and an end portion 122 formed in a T shape. Below this end portion is a narrowed bent section 124. During assembly the end 122 is inserted within the narrowed section 31 of the Y-shaped groove 30 such that the wings of the T-shaped end 122 reside on the back surface of the rear wall 24 which is shown in phantom line in FIG. 3.

Assembly of the above-described anchorage 20 is performed as follows. The spring 56 is inserted within the groove 30 in the manner described above such that the coiled portion 86 resides just below the narrowed portion of the groove 30. The latch plate assembly 50 (comprising the carrier 52 and latching mechanism 54) is slid within the top open end 126 of the guide rail 22 with the carrier guide mechanism 78 entering the guide rail first. The latch plate assembly 50 is depressed such that the bar 112 resides below the front rails 28 thereby partially entrapping the latch plate assembly 50 to the guide rail 22. Thereafter, the latch plate assembly 50 is urged downwardly into the channel 34 whereupon the spring 56 is entrapped by the retainer formed by the posts 76, and curved top portion 82. The further downward motion of the latch plate assembly 50 pushes the coiled portion 84 of the spring downward in the channel unrolling same, permitting the now unrolled or flat portion 86 of the spring to lie below the groove 68 formed on the underside of the lower carrier plate 60. As the latch plate assembly 50 is moved further down the guide rail, the latch bar 112 will be positioned just below one of the pairs of cut-outs 36 whereupon the resilient carrier urges the bar upwardly into such cut-out, locking the latch plate assembly in place.

FIG. 2 also illustrates an alternate embodiment of the invention wherein an optional flat, bifurcated spring 130, having extending legs 132a and b is inserted within the V-shaped space 134 (see FIG. 6) within the carrier 52 thereby providing additional resiliency in the operation of the present invention. FIGS. 15 and 16 illustrate views of the spring 130. The spring 130 also includes a hook 136 extending from the body of the spring 130. The hook 136 is received in the recess 138 and extends over a portion of the end 64 (see FIGS. 3 or 13).

FIG. 13 illustrates a portion of FIG. 3. Attached to the latch plate assembly and more particularly to the bushing 102 is a D-ring 140 of known variety. As is known in the art, the D-ring is often called a turning loop. The D-ring 140 is rotationally secured to the bushing 102 by a fastener 142. The D-ring includes a loop or opening 144 for receipt of a portion of the seat belt 146. To reposition the D-ring, it is pushed inwardly (see arrow 148) thereby compressing the carrier 52, causing the latch bar 112 to move inwardly out of one of the cut-outs 36. With the latch bar 112 in this position, the occupant of the vehicle can move the D-ring up and down within the anchorage 20 such that the seat belt 146 is now able to extend across the shoulder and upper torso of the occupant in a comfortable manner. However, if only an inward force acts on the D-ring 140, the spring 56 will move the carrier to the top of the guide rail.

FIGS. 17–19 show various views of a cover assembly 160 for the guide rail 22 and latch plate assembly 50. The cover assembly 160 includes a cover plate or outer cover 162 adapted to snap fit over the guide rail and a slide or inner cover 164 movable with the latch plate assembly 50. The cover plate 162 is formed with two axially extending grooves 166a,b to receive the slide 164. Locking tabs 168a-d extend inwardly proximate the groove to snap fit to the guide rail 22 at the wide top and bottom portions of the front walls 28, such as at locations 70a-d (see FIG. 1). Extending dowardly from the cover plate 162 and a plurality of flat locating tabs 172a-d which engage the side walls 26 of the guide rail. Locking end tabs 174a-d are provided to snap fit with top and bottom portions of the guide rail 22. The ends 176a and b of the cover plate 162 are raised so that interior vehicle trim 180 (shown in phantom line) can fit therebehind, the plate 162 also includes an oblong opening 182. The slide 164 includes an oblong body 184 having a circular boss 187 defining an opening 186 through which the bushing 102 extends. Vertical motion of the slide 164 is limited when the boss 187 contacts the opening 182. As the bushing 102 is moved in the guide rail 22, the side 164 moves therewith. The ends 188a, b are made thinner than the body 184 so that it may curve if an obstruction interior to the vehicle trim is encountered so that these ends can flex. It should be appreciated that the ends 188 are positioned behind the vehicle trim.

It should be noted that the carrier 52 shown in FIGS. 2 and 3 is shown in its unstressed condition wherein only a portion of the bottom 66, near the spring retainer 74, and end 65 are in contact with the rear wall 24. When the bushing 102 is depressed, the flexible lower carrier plate 60 deforms against the rear wall 24 wherein a greater portion of the bottom 66 is in contact with the rear wall.

During a crash situation, the shoulder belt 146 will be prevented from extending as a retractor mechanism 150 of known variety locks. In this crash situation, the occupant will tend to move forwardly thereby tensioning the seat belt 146 in the direction of the arrows 152a and b. In this stressed condition and by virtue of the mode of attachment of the D-ring to the latch plate assembly, a torsional force (see arrow 154) is imparted to the latch plate assembly 50. By orienting the latch bar 112 below the attachment point of the D-ring 140 to the bushing 102, takes advantage of the forces and torques generated during a crash situation thereby further urging the latch bar outwardly from the guide rail 22 and further into its corresponding cut-out 36 to insure that the latch bar remains in its selected position during such emergency situations.

Many changes and modifications in the above described embodiment of the invention can, of course, be carried out without departing from the scope thereof. Accordingly, that scope is intended to be limited only by the scope of the appended claims.

We claim:

1. An adjustable seat belt anchorage (20) comprising:
   a guide rail (22) adapted to be secured to a portion of a vehicle (24) generally at or above occupant shoulder height, the guide rail (22) forming an open channel (34), a plurality of pairs of cut-outs (36) oppositely positioned in the front walls (28) of the guide rail;
   a latch plate assembly (50) comprising:
   a resilient carrier (52) slidingly received within the channel (34);
   a latching mechanism (54) biased into the guide rail by the carrier (52) and supported by and movable within the carrier (52) including a latch bar means (112) extending upwardly from the carrier (52) for engaging a selected pair of cut-outs (36) and an attachment means (102) for supporting a D-ring (140), wherein the attachment means is located relative to the latch bar means (112) in a manner that forces and torques exerted upon the safety belt (146) and D-ring (140) tend to urge the latch bars means (112) into the cut-outs (36) in the guide rail (22) and
   a spring (56) to upwardly bias the latch plate assembly comprising a coiled end (84) slidably received within a portion of the carrier (52) and extendable along the guide rail (22) as the carrier is moved therealong including an attachment end (122) secured to the guide rail proximate a first stop (32) formed therein.

2. The anchorage (20) as defined in claim 1 wherein the carrier (52) comprises: a lower carrier plate (60) and upper carrier plate (62) oriented to permit relative motion therebetween, the lower carrier plate (60) includes, at a lower end thereof, first means (72) for retaining the coiled portion (84) of the spring (56) and second means (78) for stabilizing the carrier (22) relative to the groove (34), a groove or slot (68) located in a lower surface (66) of the lower carrier plate (60) below which is located an extended portion (86) of the spring (56) and a tab (70) extending from the lower carrier plate (60) opposite the first means, for engaging the first stop (32).

3. The anchorage (20) as defined in claim 2 wherein the first means (72) includes a pair of vertically extending posts (76) and an arcuately shaped top portion (82) into which is received the coiled portion (84) of the spring (56).

4. The anchorage (20) as defined in claim 2 wherein the second means includes a pair of lateral extending ribs (78) each defining an engagement surface (80) for engaging side walls (26) of the guide rail (22).

5. The anchorage as defined in claim 1 wherein the lower carrier plate (60) and upper carrier plate (62) are of unitary construction and are hinged mounted at a reinforced end (64) and wherein a bifurcated spring (130) located between the upper and lower carrier plates to supplement the resiliency thereof.

6. The anchorage (20) as defined in claim 2 wherein a rear wall (24) of the guide rail (22) includes a Y-shaped opening, a portion of the guide rail (22) proximate the Y-shaped is raised upwardly to form the first stop (32), and wherein one end (122) of the spring (56) is received within the Y-shaped opening.

7. The anchorage (20) as defined in claim 2 wherein latching mechanism (54) includes an apertured latch plate (106) into with is secured the attachment means (102).

8. The anchorage (20) as defined in claim 7 wherein the attachment means (102) is a threaded bushing (102) adapted to receive the D-ring, the bushing (102) secured to the latch plate (106) proximate its aperture.

9. The anchorage (20) as defined in claim 8 wherein the latch plate (106) and upper carrier plate (62) coact to snap fit together.

10. The anchorage (20) as defined in claim 1 wherein the attachment means (102) is located above the latch bars means (112).

11. The anchorage (20) as defined in claim 1 including a cover assembly (160) comprising a cover plate (162) fitted to the guide rail (22) having an elongated opening (182) therein, an inner cover or slide (164) fitted about the attachment means (106), which extends through the opening (180), and movable therewith, the inner cover or slide (164) slidably mounted to the cover plate (162).

12. The anchorage (20) as defined in claim 11 wherein the ends (188) of the inner cover or slide (164) are adapted to be positioned behind interior trim portions (180) and are flexible.

* * * * *